Figure 1:
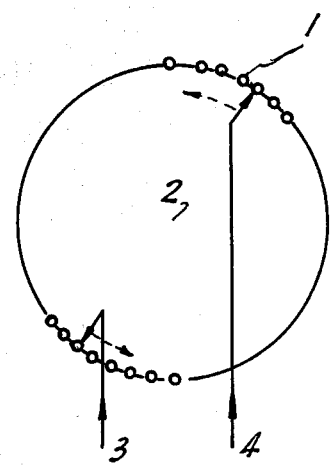

United States Patent [19]

Johnson

[11] 3,999,187

[45] Dec. 21, 1976

[54] DOPPLER VOR BEACONS

[75] Inventor: Brian Robert Johnson, Hunters Hill, Australia

[73] Assignee: Amalgamated Wireless (Australasia) Limited, Sydney, Australia

[22] Filed: Aug. 19, 1974

[21] Appl. No.: 498,503

[52] U.S. Cl. .............................. 343/844; 343/102; 343/106 R; 343/106 D
[51] Int. Cl.² .......................................... G01S 1/40
[58] Field of Search ............. 343/101, 102, 106 D, 343/106 R, 113 DE, 832, 844, 854

[56] References Cited

UNITED STATES PATENTS

| 3,281,843 | 10/1966 | Plummer ....................... 343/106 R |
| 3,474,446 | 10/1969 | Shestag et al. ............. 343/106 R X |

OTHER PUBLICATIONS

Colin et al., *Principles of Tacan*, Article in "Electrical Communication", vol. 33 No. 1, Mar. 1956, p. 24.

*Primary Examiner*—Eugene La Roche
*Attorney, Agent, or Firm*—Beveridge, DeGrandi, Kline & Lunsford

[57] ABSTRACT

A Doppler VOR beacon comprising a central antenna modulated with a reference wave and a ring of omnidirectional antennas radiating sidebands of a sub-carrier amplitude modulation of the carrier commutated around the ring of antennas to simulate a rotating source, in which the central antenna in comparison with the ring antennas has a higher gain towards the horizon and over a predetermined angle above the horizon. The central antenna may comprise a vertically stacked array, the elements of which may be Alford loops.

3 Claims, 2 Drawing Figures

DOPPLER VOR BEACONS

The object of this invention is to provide a means of increasing the effective radiated power of a doppler VOR beacon without incurring the expense and disadvantages that would arise from a simple increase in the energy applied to the beacon from the associated transmitter.

A Doppler very high frequency omnirange (VOR) beacon is used to provide to aircraft fitted with an appropriate receiver, radio signals containing bearing information. The Doppler VOR system is described in a paper "Doppler V.H.F. Omnirange Beacons", by B. R. Johnson & J. G. N. Lee, Proc. IREE. (Aust) June, 1973.

Typically a Doppler VOR beacon consists of a ring of omnidirectional antennas and a central antenna. The central antenna radiates carrier power modulated with a reference wave (typically a 30 Hz sinewave), station identification signal and voice information. The radiation from the ring of antennas consists of sidebands of a sub-carrier amplitude modulation of the carrier. These are commutated around the ring of antennas in such a way as to simulate a rotating source, the angular velocity of which corresponds to the modulation frequency of the amplitude modulation reference.

The combined signal received in space is a carrier signal amplitude modulated with a reference signal, a subcarrier, identification and (sometimes) voice. The subcarrier is, in a typical system, 9960 Hz and the reference and subcarrier modulations are each 30% amplitude modulated. The ring of antennas is approximately 44 feet in diameter giving a ±480 Hz deviation of the subcarrier at a frequency of 30 Hz. Bearing to the beacon is derived by measuring the phase difference between the 30 Hz AM and the 30 Hz FM of the subcarrier. In a system such as that described with a carrier power of 100 Watts the power in each sideband is $0.15^2 \times 100$ Watts, that is 2.25 Watts.

In order to make a substantial increase in radiated power by increasing the transmitter power, an expensive addition to the transmitter capability must be made with the further disadvantage of increased primary power consumption and heat dissipation. An alternative solution, of increasing the effective radiated power by increasing the gain of all antennas in a uniform way, is not attractive because the disadvantageous parasitic current induced in the closely spaced sideband antennas would be increased.

The present invention relates to an arrangement in which the sideband power is radiated from low gain antennas such as the commonly used Alford loops, and in which the sideband radiated power is increased relative to the carrier power, and in which the carrier is radiated from an antenna which has higher gain in directions towards the horizon and at specified angles above it.

A Doppler VOR beacon in accordance with this invention comprises a central antenna, a plurality of omnidirectional antennas disposed around the periphery of a circle centred on the central antenna, means for radiating from the central antenna carrier power modulated with a reference wave, means for radiating from at least one of the circumferentially-disposed antennas at least one sideband of a sub-carrier amplitude modulation of the carrier, and means for commutating the sideband radiation around the ring of antennas to simulate a rotating source, wherein the central antenna in comparison with the individual antennas in the ring of antennas has a higher gain towards the horizon and over a predetermined angle above the horizon.

Typically the central antenna may comprise a plurality of the customarily-used Alford loops or other suitable antenna elements having an omnidirectional horizontal radiation pattern, stacked one above the other and each fed with carrier power suitably controlled in amplitude and phase. The vertical radiation pattern of such an array is arranged so that the signal from the sideband antenna (taking into account the increased power fed to it) and the signal from the central carrier antenna produce the required amplitude modulation of the carrier by the sub-carrier at angles of elevation from the horizon to the maximum required operational angle (typically + 35°). The depth of modulation of the carrier by the sub-carrier required by international regulation is between 28% and 32%. Paragraph 3.3.5.2 and 3.3.5.3 Aeronautical Telecommunications Annex 10 to the Convention of International Civil Aviation, Vol. I, 3rd Edition, July, 1972. Hence the respective powers radiated from the central antenna, and from the circumferentially-disposed antennas are in a predetermined ratio to each other.

Figure 2:
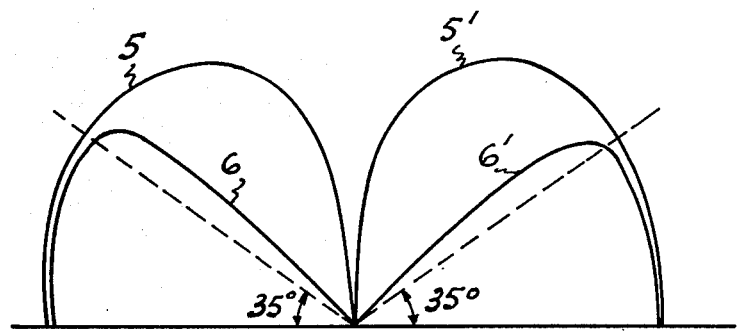

The invention will now be described in greater detail with reference to the accompanying drawings, of which FIG. 1 is a schematic diagram of the antenna arrangement of a double sideband Doppler VOR beacon and FIG. 2 shows vertical polar diagrams of the antennas.

In FIG. 1 a ring of omnidirectional antennas 1 (of which only a few are shown) is arranged concentrically around a central antenna 2 which radiates carrier power modulated with a reference wave, a station identification signal and (if desired) by voice. At any one instant upper and lower sidebands of the carrier are radiated respectively from two diametrically opposite antennas of the ring, being fed from feeders 3 and 4 respectively. By switching means the sideband energy is commutated from antenna to antenna around the ring, as represented by the dashed arrows. Because of the commutation, the effect on an aircraft receiver is the same as would be produced by two physical sideband radiators rotating around the ring. Due to the Doppler effect, the rotation causes frequency modulation of the received sideband radiation, the phase of which frequency modulation, relative to the phase of the reference signal radiated by the central antenna, indicates the bearing of the aircraft from the beacon.

In FIG. 2 the vertical polar diagram of a peripheral antenna is represented by 5, 5¹ and that of the central antenna by 6, 6¹. According to the invention radiation from the central antenna is concentrated in a region below a predetermined vertical angle (in this case 35°, as shown by the dashed lines), in which region the power radiated from the central antenna bears the required relationship to the increased power radiated from the peripheral antennas.

The advantage of the arrangement in accordance with this invention is that only a small increase in total transmitter power is required to achieve a substantial increase in effective radiated power. The increase in sideband power does not require expensive transmitter extensions, substantial extra primary power or substantially increased heat dissipation.

The principle of this invention is described in relation to a double sideband Doppler VOR beacon but could also apply to single sideband or alternating sideband Doppler VOR beacons.

What is claimed is:

1. In a Doppler VOR beacon comprising a central antenna having an omnidirectional radiation pattern in the horizontal plane, a plurality of antennas each having an omni-directional radiation pattern in the horizontal plane disposed around the periphery of a circle centered on the central antenna, means for radiating from the central antenna carrier power modulated with a reference wave, means for radiating from at least one of the circumferentially-disposed antennas at least one sideband of a sub-carrier amplitude modulation of the carrier, and means for commutating the side-band radiation around the ring of antennas to simulate a rotating source, the respective powers radiated from the central and circumferentially-disposed antennas being in a predetermined ratio to each other, the improvement wherein: the gains of the circumferentially-disposed antennas in the horizontal plane are equal one with another, but the gain of the central antenna in the horizontal plane is greater than that of any one of the circumferentially-disposed antennas, and the radio frequency power applied to the circumferentially-disposed antennas is greater than that which would be required to provide said predetermined power ratio in the case where the gain of the circumferentially-disposed antennas in the horizontal plane is equal to that of the central antenna.

2. A Doppler VOR beacon in accordance with claim 1 wherein the central antenna comprises a vertically-stacked array of antenna elements.

3. A Doppler VOR beacon in accordance with claim 2 wherein the antenna elements forming the central antenna are Alford loops.

* * * * *